US012247440B2

(12) United States Patent
Hickey

(10) Patent No.: US 12,247,440 B2
(45) Date of Patent: Mar. 11, 2025

(54) HIGH DEFINITION SCREEN MATERIALS

(71) Applicant: Florida Sales & Marketing, Fort Myers, FL (US)

(72) Inventor: Nicole Hickey, Fort Myers, FL (US)

(73) Assignee: Nico IP, LLC, Fort Myers, FL (US)

( * ) Notice: Subject to any disclaimer, the term of this patent is extended or adjusted under 35 U.S.C. 154(b) by 0 days.

(21) Appl. No.: 18/208,419

(22) Filed: Jun. 12, 2023

(65) Prior Publication Data

US 2024/0410223 A1 Dec. 12, 2024

(51) Int. Cl.

| | |
|---|---|
| ***E06B 9/52*** | (2006.01) |
| ***D01F 6/62*** | (2006.01) |
| ***D03D 9/00*** | (2006.01) |
| ***D03D 13/00*** | (2006.01) |
| ***D03D 15/283*** | (2021.01) |
| ***D03D 15/47*** | (2021.01) |
| ***D06M 15/248*** | (2006.01) |
| *D06M 101/32* | (2006.01) |

(52) U.S. Cl.

CPC .................. *E06B 9/52* (2013.01); *D01F 6/62* (2013.01); *D03D 9/00* (2013.01); *D03D 13/008* (2013.01); *D03D 15/283* (2021.01); *D03D 15/47* (2021.01); *D06M 15/248* (2013.01); *D06M 2101/32* (2013.01); *D10B 2331/04* (2013.01); *D10B 2401/063* (2013.01); *D10B 2503/00* (2013.01); *E06B 2009/524* (2013.01)

(58) Field of Classification Search

CPC ... E06B 9/52; E06B 2009/524; D03D 15/283; D03D 15/47; D03D 9/00; D03D 13/008; D06M 15/248; D06M 2101/32; D10B 2331/04; D10B 2401/063; D10B 2503/00

See application file for complete search history.

(56) References Cited

U.S. PATENT DOCUMENTS 4,144,371 A * 3/1979 Okie ........................ D04H 1/54 442/3
2019/0338586 A1* 11/2019 Swiszcz .................... E06B 9/52

FOREIGN PATENT DOCUMENTS

KR 20150053116 A * 5/2015
WO WO-2004088078 A2 * 10/2004 ............... D03D 9/00

OTHER PUBLICATIONS

Super Screen, available Feb. 7, 2023, accessed Aug. 23, 2023 from https://super-screen.com/ (Year: 2023).*
Machine translation KR20150053116 (Year: 2015).*
Bo-Lite 4x5, accessed Dec. 20, 2023 from https://safecovertextiles.com/bo-lite-4-x-5/, available Jan. 27, 2023, (Year: 2022).*
Pet Screen, http://www.petscreen.org/screen/pet-screen/pet-vinyl-coated-polyester-screen.html, available Oct. 7, 2018 (Year: 2018).*

* cited by examiner

*Primary Examiner* — Abe Massad
*Assistant Examiner* — Jeremy C Ramsey
(74) *Attorney, Agent, or Firm* — Eckert Seamans Cherin & Mellott, LLC

(57) ABSTRACT

Screen material with improved visibility for use as an insect screen. The screen material is formed of a web of polymer coated threads having a denier of 190 to 360, wherein the polymer coated threads comprise 20-30 wt. % polyester thread core and 70-80 wt. % PVC coating.

18 Claims, 3 Drawing Sheets

HIGH DEFINITION SCREEN MATERIALS

TECHNICAL FIELD

This invention relates generally to screen materials, and more specifically to woven insect screens.

BACKGROUND

Insect screens have been in use on windows and doors for more than a century to keep out common insects such as flies, moths, mosquitoes, and bees as well as other creatures such as birds and rodents. These screens have historically been woven from various materials, such as wire made of low-carbon steel, bronze, stainless steel, or aluminum. More recently, vinyl coated fiberglass has become popular and is now the industry standard for common insect screens.

The basic woven construction of a screen will inherently compromise both light transmission and optical clarity, i.e., visibility through the screen, as well as airflow through the screen. Light transmission relates to the quantity of light that passes through the screen, and optical clarity is a measure of image distortion caused by the interference of the wires of the screen with the visual image as viewed through the screen. Insect screen construction has been optimized over the years to reach a balance between excluding most insects and enabling reasonable visibility and airflow through the screen.

However, there remains a need in the industry for improved screen materials that optimize both of the visibility characteristics and the airflow characteristics. In particular, there is a need in the industry for an "invisible screen" that is still able to exclude even the smallest insects.

SUMMARY

The present disclosure provides a screen material that meets this need. The screen material generally comprises a mesh of intersecting elements, wherein the intersecting elements comprise polymer coated threads having a denier of 420 or less.

The denier of the polymer coated threads may be 360 or less, such as 300 or less, or 250 or less. The denier of the polymer coated threads may be 190 to 250.

The polymer coated threads of the screen material may comprise polyvinyl chloride (PVC) coated polyester threads. For example, the polymer coated threads may comprise 20-30% by weight polyester thread core and 70-80% by weight PVC coating, such as 25% by weight polyester thread core and 75% by weight PVC coating.

The screen material may have a mesh count of 17×14, 17×20, or 20×20, such as for use as an insect screen for small insects.

The screen material may have a weight of less than 6.0 oz/yard$^2$. For example, when the screen material has a mesh count of 20×20, it may have a weight of less than 6.0 oz/yard$^2$, such as less than 5.8 oz/yard$^2$, or less than 5.6 oz/yard$^2$, or less than 5.4 oz/yard$^2$, or even less than 5.2 oz/yard$^2$. Alternatively, when the screen material has a mesh count of 17×14, it may have a weight of less than 5.0 oz/yard$^2$, such as less than 4.5 oz/yard$^2$, or even less than 4.0 oz/yard$^2$.

The screen material may have a mesh count of 20×20, an abrasion resistance of greater than 500, as measured by ASTM D3884-09-2013, and a tensile strength for each of warp and weft of greater than 120 lbf, as measured by ASTM D5035-11. Alternatively, the screen material may have a mesh count of 17×14, an abrasion resistance of greater than 500, as measured by ASTM D3884-09-2013, and a tensile strength for each of warp and weft of greater than 70 lbf, as measured by ASTM D5035-11.

The screen material may have an optical clarity of at least 65%. The optical clarity may be at least 75%, or at least 85%, such as 65% to 98% or 75% to 98%.

The screen material may have a light transmission of at least 50%. The light transmission may be at least 60%, or at least 70%, such as to 60% to 90% or 70% to 98%.

The present disclosure also provides screen panels, such as panels positioned within a frame, wherein each side of the frame includes a spline groove having an outward facing opening and a recessed portion, wherein the opening is configured to receive an edge of the screen material and an elastomeric spline component to secure the screen material to the frame side.

The present disclosure also provides screen enclosures formed using the screen material disclosed herein.

Other aspects, features, benefits, and details of the present invention can be more completely understood by reference to the following detailed description of the preferred embodiments, taken in conjunction with the drawings and from the appended claims.

BRIEF DESCRIPTION OF THE DRAWINGS

In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

The present disclosure provides a screen material useful for excluding insects, i.e., an insect screen. Common insect screens used today include 15×12, 16×16, and 18×14 meshes of plain weave construction. However, in certain geographical regions where small biting midges and sand flies are present, 17×20 and 20×20 mesh screening would be recommended to exclude these insects. Accordingly, the screens disclosed herein may have mesh counts of 17×14 or greater, such as 17×20, 20×20, 25×25, 30×30, or even 35×35.

Figure 1:
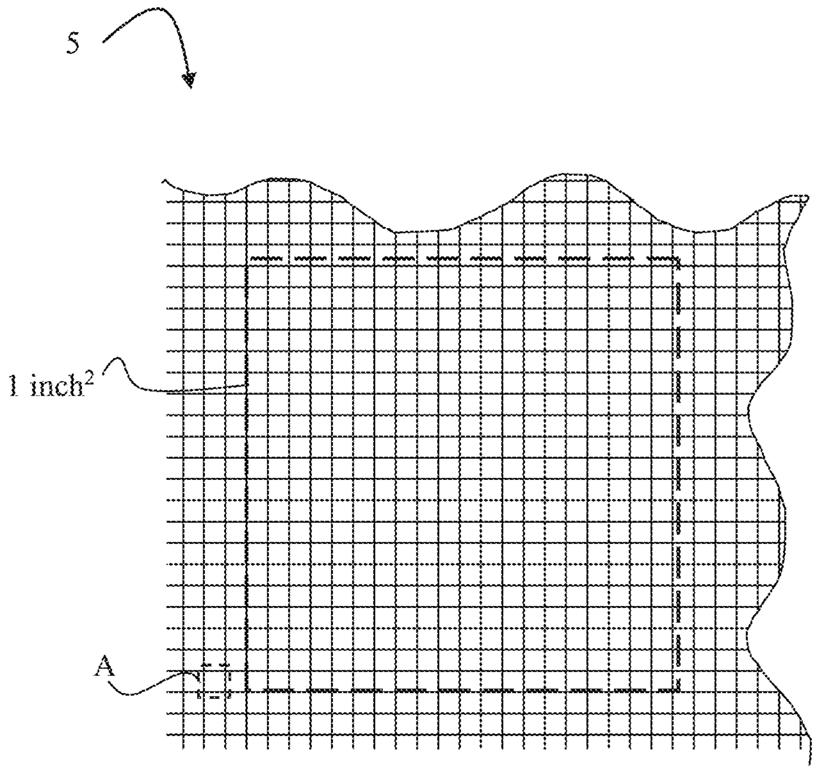
FIG. 1 is a fragmentary view of a screen material according to the present disclosure.
Figure 2:
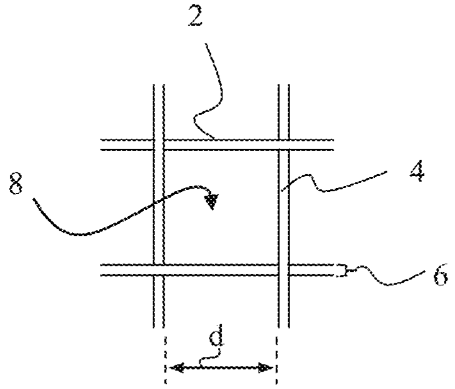
FIG. 2 is a fragmentary view of a portion of the insect screen material shown in FIG. 1.

To improve understanding in this disclosure, the term "mesh" will be understood to be a woven or knit material having evenly spaced openings or apertures, and "mesh count" will be understood to be a measure of the number of apertures per inch, which is essentially equivalent to the number of threads that lie in each direction per inch of the mesh. For example, a screen with a 17×20 mesh count would have 17 apertures per inch in one direction and 20 apertures per inch in the perpendicular direction. A mesh (5) having a 20×20 mesh count is shown in FIG. 1. The threads in each direction are referred to as the warp and weft, wherein warp is typically defined as the threads running lengthwise during weaving, while weft is defined as the threads running across the width during weaving. With reference to FIG. 2, an enlarged view of the section of the mesh labelled 'A' in FIG. 1 is shown, wherein the warp threads (4) and weft threads (2) are pointed out.

Of note, the mesh count does not provide any information regarding the relative size (diameter "d" of FIG. 2) of the apertures (8) in a woven screening as different diameter threads will provide different diameter apertures. As used herein, the term "aperture" will be understood to mean the open space between adjacent parallel threads, usually expressed in decimal parts of an inch, and "aperture diameter" is understood to be the dimension of the aperture. For a plain square weave, aperture diameter can be calculated using the equation:

$$A_1 = 1 - (N_1 \times D) \text{ and } A_2 = 1 - (N_2 \times D)$$

where $A_1$ is the aperture diameter in the warp direction, $A_2$ is the aperture diameter in the weft direction, $N_1$ is the number of threads per unit measurement in the warp direction, $N_2$ is the number of threads per unit measurement in the weft direction and D is the thread diameter (50). Typically, these values are expressed in inches. The percent open area of a screen mesh may then be calculated as:

$$(A_1 \times A_2) \times 100.$$

Most screens on the market today have a thread diameter (6) that is 0.5 mm or more, and a denier that is 420 or greater (≥420 d). Denier is a unit of weight used in the textile industry to measure the linear mass density of fibers and is based on a standard mass per length of 1 gram per 9,000 meters of a strand of silk. The screen materials of the present disclosure have much smaller diameters, and much lower denier. For example, the threads of the presently disclosed screen materials are less than 420 denier, such as less than 400 denier, 380 denier, 360 denier, 340 denier, 320 denier, 300 denier, 280 denier, or even less than 260 denier. The threads of the presently disclosed screen materials may be at least 120 denier, such as at least 140 denier, 160 denier, 180 denier, 200 denier, or even 220 denier. The threads of the presently disclosed screen materials may have a denier in a range defined by any of the noted upper and lower limits for denier, such as 140 to 360 denier, or 160 to 300 denier, or 190 to 250 denier.

The low denier of the threads of the presently disclosed screen materials provides screens having a percent open area of at least 40%, such as at least 45%, or at least 50%, or at least 55%, or at least 60%. For example, a screen according to the present disclosure having a 20×20 mesh count may have a percent open area of greater than 50%, such as 52% or more, while a screen according to the present disclosure having a 17×14 mesh count may have a percent open area of greater than 60%, such as 64% or more.

Moreover, the low denier of the threads of the presently disclosed screen materials provides screens that are lighter weight than prior art screen materials, which typically have weights of greater than 6.5 oz/yard$^2$, depending on the mesh count of the screen. For example, a standard polymer coated fiberglass screen well known in the art generally has a denier of 420. A 17×14 mesh count of this prior art screen material has a weight of 6.5 oz/yard$^2$, a 17×20 mesh count has a weight of 6.5 oz/yard$^2$, and a 20×20 mesh count of 8.2 oz/yard$^2$. The presently disclosed screen materials may have weights of less than 6.0 oz/yard$^2$. For example, a screen material of the present disclosure having a mesh count of 20×20 may have a weight of less than 6.0 oz/yard$^2$, such as less than 5.8 oz/yard$^2$, or less than 5.6 oz/yard$^2$, or less than 5.4 oz/yard$^2$, or even less than 5.2 oz/yard$^2$. Alternatively, a screen material of the present disclosure having a mesh count of 17×14, may have a weight of less than 5.0 oz/yard$^2$, such as less than 4.5 oz/yard$^2$, or even less than 4.0 oz/yard$^2$.

Another novel aspect of the presently disclosed screen materials is that the threads forming the mesh of the screens are not metals Rather, the threads may be formed of any non-metal fiber, such as polymeric fibers, and may be monofilament or multifilament. Exemplary fibers include at least polyester, nylon, polyolefin, polyamide, polyimide, polyaniline, polypropylene, polyethylene, high density polyethylene (HDPE), polyvinyl alcohol (PVA), polyethylene oxide (PEO), polyurethane (PU/TPU), polysulfone, polyacrylonitrile (PAN), polybenzimidazole (PBI). Further exemplary fibers include fluoropolymers such as ethylene tetrafluoroethylene (ETFE), ethylene chlorotrifluoroethylene (ECTFE), polytetrafluoroethylene (PTFE), fluorinated ethylene propylene (FEP), perfluoroalkoxy (PFA), polyvinylidene fluoride (PVdF), tetrafluoroethylene perfluoromethylvinylether (MFA), tetrafluoroethylene hexafluoropropylene vinylidene fluoride (THV), polyetheretherketone (PEEK), and polyvinylidene fluoride (PVDF). In preferred examples, the thread is a polyester thread.

The thread may be polymer coated, such as by a vinyl or polyvinyl chloride (PVC) coating. The polymer coating may form up to 60 wt. % of the polymer coated thread, such as up to 65 wt. %, or 70 wt. %, or 75 wt %, or even up to 80 wt. %, based on the total weight of the polymer coated thread. The polymer coating may be not more than 90 wt. % of the polymer coated thread, such as not more than 85 wt. %, or 80 wt %, or 75 wt. %, or even not more than 70 wt. %, based on the total weight of the polymer coated thread. The polymer coated threads may include the polymer in a range defined by any of the above noted upper and lower limits, such as 60 wt. % to 90 wt. % or 70 wt. % to 80 wt %, wherein the remainder of the total wt. % comprises the thread.

In a preferred example, the polymer coated thread comprises a polyester thread core having a PVC coating, wherein the polyester thread comprises 20-30 wt. % and the PVC coating comprises 70-80 wt. %, based on the total weight of the PVC coated polyester thread. In a specific example, the polymer coated thread comprises 25 wt. % of a polyester thread and 75 wt. % of the PVC coating, based on the total weight of the PVC coated polyester thread. Of note, the polyester thread will be completely coated by the PVC such the thread forms a core of the final PVC coated polyester thread.

The screen materials disclosed herein may be woven or knitted using standard weaving or knitting processes. Weaving constructions can include plain weave, twill weave, satin weave, and others such as the leno weave. According to certain aspects, the mesh is constructed by a plain weave of the polymer coated threads.

According to certain aspects, the coating may be applied to the thread before the mesh is formed or after the mesh is formed. When applied before the mesh is formed, the coating may be softened or partially melted to adhere thread junctions to one another, i.e., melt bonding, and thus stabilize the mesh. For example, heat can be generated locally at the fiber intersections by applying ultrasonic energy, such as through an ultrasonic horn and anvil system. This process can be accomplished when the fabric is stationary using a plunge and activate method or may be accomplished in a continuous process using a horn and rotary anvil.

The screen materials disclosed herein may be colored, such as by coloring the polymer coating. Exemplary colors include at least black and white. It has been found that a darker color such as black is preferable to reduce reflective glare. Moreover, the PVC coating may have a matt finish or may include additives to provide a matt finish.

When light interacts with a screen material, many things happen that are important to the visibility of the screen material and the visibility through the screen material. For example, the visibility of a screen material can be influenced by light transmission, reflection, scattering, and variable spectral response resulting from the coatings, dimensions of the polymer coated threads, type of weave design of the mesh, and/or dimensions of the apertures in the mesh. In order to render a screen material nearly invisible and/or improve visibility through the screen, the present inventor has, in addition to other aspects, reduced the thread denier to maximize light transmission through the screen material and minimize reflectance from the screen material.

The procedure to measure light transmission through the screen material generally makes use of a spectrometer suitable for measurements at wavelengths of approximately 200 to 3100 nanometers, such as at least in the visible range of wavelengths (380-700 nanometers). Transmission refers to the amount of light that can successfully pass through a material and is usually expressed as a calculated percentage. Thus, for example, thin sheets of clear glass may have a light transmission of nearly 100%.

The screen materials disclosed herein may provide a light transmission of at least 50%, such as at least 55%, or 60%, or 65%, or 70%, or 75%, or 80%, or 85%, or even at least 90%. The screen materials disclosed herein may provide a light transmission of up to 99%, such as up to 90%, or 85%, or 80%, or 75%, or 70%. The screen materials disclosed herein may provide light transmission in a range defined by any of the noted upper and lower limits for transmission, such as 50% to 99%, or 55% to 75%, or 60% to 80%.

Optical clarity describes how distorted an image is when you look at it through the screen material and is generally measured as the percentage of regular rays that are diffracted at an angle of less than 2.5 degrees from normal, sometimes referred to as narrow angle scattering. Optical clarity may be measured using a transparently meter, which provides a measurement of the screen's total transmittance. Total transmittance is the ratio of transmitted light to the incident light and may be measured according to ASTM D1003.

The screen materials disclosed herein may provide an optical clarity of at least 55%, such as at least 60%, or 65%, or 70%, or 75%, or 80%, or 75%, or even 80%. The screen materials disclosed herein provide an optical clarity of up to 99%, such as up to 95%, or 90%, or 85%, or 80%, or 75%. The screen materials disclosed herein may provide an optical clarity in a range defined by any of the noted upper and lower limits, such as 55% to 99%, or 65% to 90%, or 70% to 95%.

The screen materials disclosed herein are flexible enough to be mounted on a frame using a conventional spline and groove attachment. For example, each side of the frame may include a groove having an outward facing opening and a recessed portion, wherein the outward facing opening is configured to receive an edge of the screen material and an elastomeric spline component to secure the screen material to the frame side.

Figure 3:
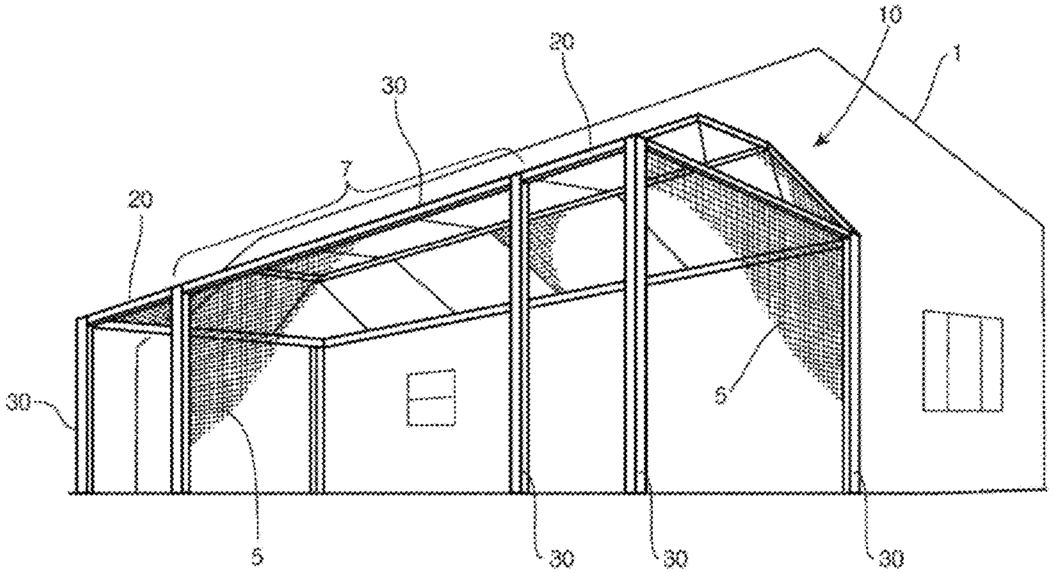
FIG. 3 illustrates a typical screened enclosure including screen materials according to the present disclosure.
Figure 4:
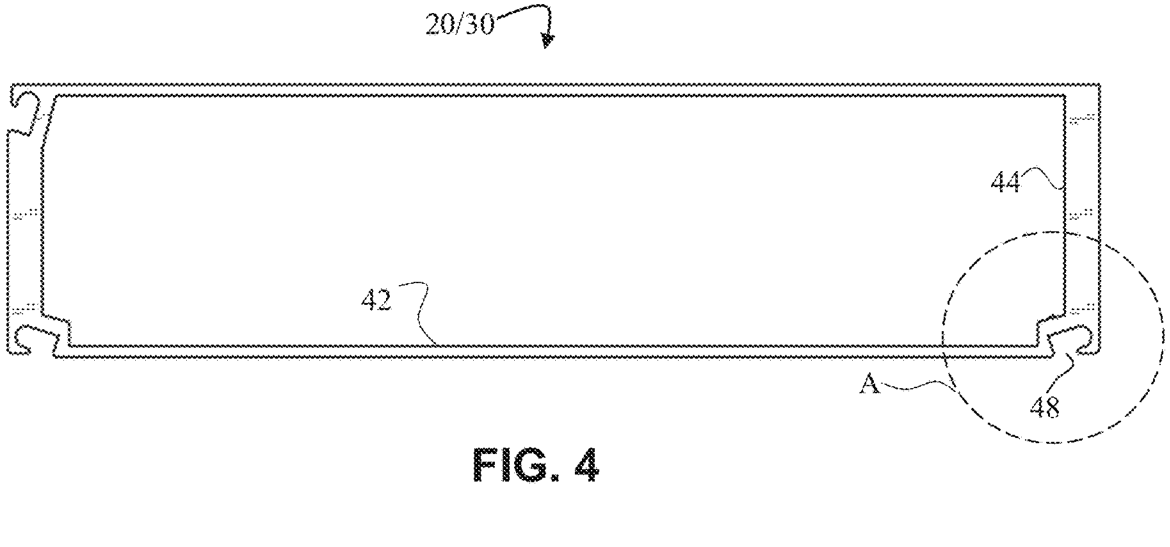
FIG. 4 illustrates an end view of a support beam configured to accept the screen materials of the present disclosure.
Figure 5:
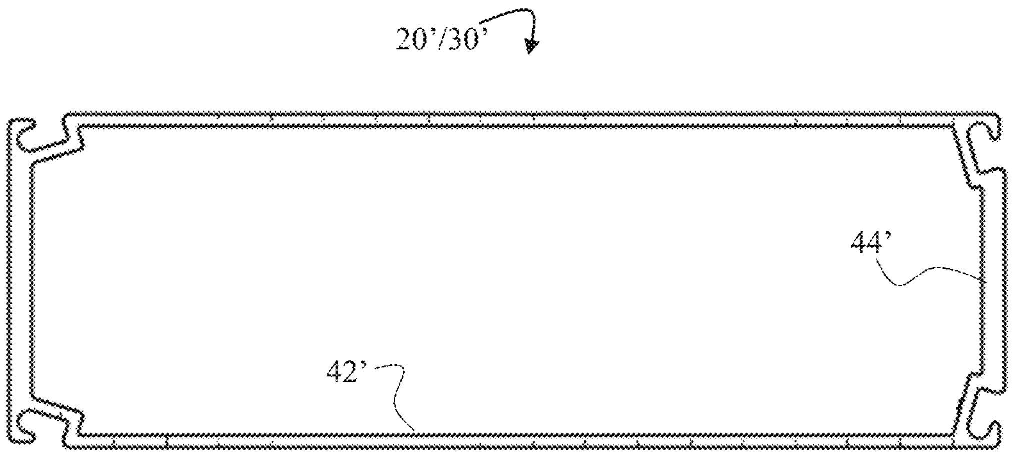
FIG. 5 illustrates an end view of another support beam configured to accept the screen materials of the present disclosure

Moreover, since the presently disclosed screen material is light weight, it may be used to span large openings within a frame, such as a frame configured for use in patio and pool enclosures, greenhouses, and the like. An exemplary enclosure 10 attached to a building 1 is shown in FIG. 3, wherein the screen material 5 is shown spanning the region between support beams positioned in the horizontal 20 and vertical 30 orientation. The support beams (20, 30) can be any shape know in the art, such as circular, triangular, hexagonal, square, or rectangular as shown in FIGS. 4 and 5. One or more exterior sides (42, 44) of such beams (20/30) may include a groove 48 that extends longitudinally along a length of the beam. Shown in FIGS. 4 and 5 are support beams according to the present disclosure, wherein FIG. 4 illustrates a support beam (20/30) having three grooves 48 and FIG. 5 illustrates is a support beam (20'/30') having four grooves. These grooves are configured to accept the screen material and an elastomeric spline material and are thus commonly referred to a spline grooves.

Figure 6:
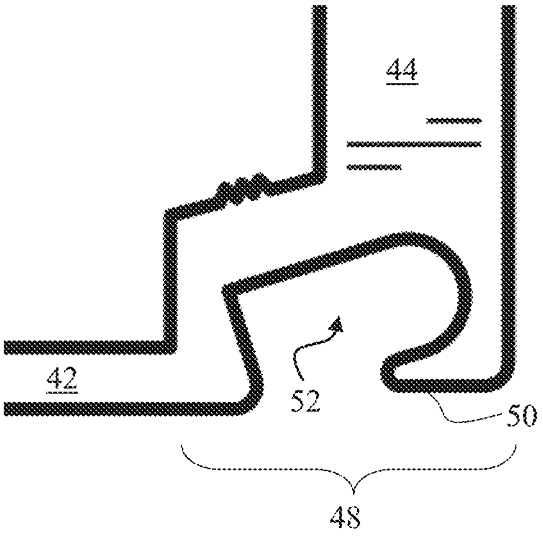
FIG. 6 illustrates a close-up detail of section A of the support beam shown in FIG. 4.

According to the present disclosure, the spline grooves 48 may include an outward facing opening and a recessed portion 52. FIG. 6 illustrates an enlarged view of the spline groove pointed out in section A of FIG. 4, wherein the outward facing opening includes a cap or overhang 50 that may aid in securing an edge of the screen material and the elastomeric spline component within the recessed opening 52 and thus to the support beam (20, 30) When the support beams are installed as the vertical and horizontal beams of an enclosure, the screen material may be sized to fit within an opening defined by the support beams and may be secured along edges thereof within the splines on the beams. That is, an edge region of the screen may be positioned over the spline groove and an elastomeric spline component may be positioned on top of the screen and pushed into the recess 52 of the spline groove, wherein the overhang 50 secures the elastomeric spline component within the recess and secures the screen along an edge of the support beam.

Accordingly, the present disclosure also provides insect screen panels having the insect screen material disclosed herein positioned in a frame. The frame may be formed using three or more of the beams shown in FIGS. 4 and 5. For example, an insect screen panel may include the presently disclosed screen material sized and shaped to fit within a frame formed by the beams, wherein each edge of the screen material is positioned within an adjacent spline groove on a beam of the frame and secured therein by an elastomeric spline component. The beams of the frame each have four flat exterior sides forming a rectangle tube with a hollow interior channel extending longitudinally therethrough, and three or more spline groves, each positioned adjacent an edge of one of the exterior sides. Each of the spline grooves generally include an outward facing opening and a recessed portion, wherein the outward facing opening is configured to receive an edge of the insect screen material and an elastomeric spline component to secure the screen panel to the elongated beam.

As shown in FIG. 4, the beam may have three spline grooves, wherein a first exterior side of the beam comprises a first spline groove that extends longitudinally along a length thereof, and a second exterior side adjacent to the first exterior side comprises second and third spline grooves that extend longitudinally along a length thereof. Alternatively, as shown in FIG. 5, the beam may have four spline grooves, wherein each of a second and forth exterior side of the elongated beam are congruent sides and comprise a first and second spline groove that extends longitudinally along a length thereof, and a third exterior side of the elongated rectangular beam comprises a third and fourth spline groove that extends longitudinally along a length thereof.

Exemplary screen panels, screened enclosures, and support beams useful for forming such enclosures are disclosed in U.S. patent application Ser. No. 18/139,114, the entire content of which is incorporated herein by reference.

Various aspects of the screen material and methods of use thereof disclosed herein have been illustrated with reference to one or more exemplary implementations or embodiments. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the words "comprising," "including," and "having" as used herein mean "including, but not limited to".

Various aspects of the screen material and methods of use thereof disclosed herein have been illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" have been used herein to describe one element's relationship to another element illustrated in the drawings. It will be understood that relative terms are intended to encompass different orientations of aspects of the support brackets in addition to the orientation depicted in the drawings. By way of example, if aspects of screen mesh shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

As used herein, the term "substantially" may be taken to represent the inherent degree of uncertainty that may be attributed to any quantitative comparison, value, measurement, or other representation. Thus, the term substantially may mean an amount of generally at least 80%, 90%, 95%, 98%, or even 99% of a stated value.

It must also be noted that as used herein and in the appended claims, the singular forms "a", "an", and "the" include the plural reference unless the context clearly dictates otherwise. Thus, for example, reference to "a" thread, "an" insect screen, or "the" polymer is a reference to one or more threads, insect screens, or polymers and equivalents thereof known to those skilled in the art, and so forth. Unless defined otherwise, all technical and scientific terms used herein have the same meanings as commonly understood by one of ordinary skill in the art.

The use of "or" means "and/or" unless specifically stated otherwise.

Other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the specification and appended claims are approximations that may vary depending upon at least the substrate used, the type and form of touch sensitive and display surfaces, and the size of the assembly or device comprising the assembly. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

When ranges are given, any endpoints of those ranges and/or numbers within those ranges can be combined within the scope of the present invention.

Examples

Screen materials having 20×20 and 17×14 mesh counts according to the present disclosure were produced using 250 denier PVC coated polyester threads as a standard plain weave. These screens were compared to prior art screens having 420 denier coated fiberglass threads as 20×20, 17×20, and 17×14 mesh counts in a standard plain weave.

The weights, thread denier, and wear characteristics for each of these samples are provided in the table below. Of note, the overall weight of the inventive screens of the present disclosure are much lower than those of the comparative prior art samples.

| Sample | Inventive | | Comparative* | | | |
|---|---|---|---|---|---|---|
| apertures per inch: warp × weft | 17 × 14 | 20 × 20 | 17 × 14 | 17 × 14 | 17 × 20 | 20 × 20 |
| Weight, ounces/yard$^2$ | 3.86 | 5.08 | 13.13 | 6.50 | 7.84 | 8.20 |
| Denier | 250 | 250 | 1000 | 420 | 420 | 420 |
| Thickness, mm | 0.47 | 0.48 | 0.77 | 0.57 | 0.61 | 0.58 |
| Yarn Diameter, mm | 0.335 | 0.335 | 0.52 | 0.43 | 0.43 | 0.43 |
| Tensile Strength (Strip), lbf ASTM D5035-11 warp, weft | 128.52, 78.75 | 129.94, 139.33 | 647.9, 478.5 | 171.51, 162.29 | 183.48, 182.55 | 204.07, 210 |
| Tear Strength (Trapezoidal), lbf ASTM D2261-13 warp, weft | 32.3, 33.74 | 15.3, 13.91 | 81.1, 59.0 | 50.97, 55.67 | 53.55, 44.62 | 32.03, 34.27 |
| % open area | 63 | 54 | 46 | 54 | 47 | 43 |

*Superscreen ®

What is claimed is:

1. A screen material comprising:

a web of intersecting threads forming substantially rectangular openings and having a mesh count of 17×14, wherein the threads have a denier of 190 to 250 and comprise 25 wt. % of a polyester thread core and 75 wt. % of a PVC coating over the polyester thread core, based on the total weight of the thread, wherein the screen material comprises an areal density of less than 4.5 oz/yard$^2$, a % open area of at least 50%, and a light transmission of at least 50%, and wherein the screen material has an abrasion resistance of greater than 500, as measured by ASTM D3884-09-2013, and a tensile strength for each of warp and weft of greater than 70 lbf, as measured by ASTM D5035-11.

2. The screen material of claim 1, wherein the threads have a diameter of substantially 0.335 mm.

3. The screen material of claim 1, wherein the screen material has an optical clarity of 60% to 98%.

4. An insect screen panel comprising the insect screen material of claim 1 positioned in a frame, wherein the frame comprises at least three elongated beams each having:

four flat exterior sides forming a rectangle tube with a hollow interior channel extending longitudinally therethrough, and three or more spline grooves, each spline groove positioned adjacent an edge of one of the exterior sides, wherein each of the spline grooves include an outward facing opening and a recessed portion, wherein the outward facing opening is configured to receive an edge of the insect screen material and an elastomeric spline component to secure the screen panel to the elongated beam, and wherein the insect screen material is sized and shaped to fit within the frame and all edges of the insect screen material are positioned within an adjacent spline groove and secured therein by the elastomeric spline component.

5. The insect screen panel of claim 4, wherein a first exterior side of each elongated beam comprises a first spline groove that extends longitudinally along a length thereof, and a second exterior side adjacent to the first exterior side comprises second and third spline grooves that extend longitudinally along a length thereof.

6. The insect screen panel of claim 4, wherein each of a first and third exterior side of each elongated beam are congruent sides and comprise a first and second spline groove, respectively, that extend longitudinally along a length thereof, and a second exterior side of each elongated beam comprises a third and fourth spline groove that extend longitudinally along a length thereof.

7. A screen material comprising:

a mesh of intersecting elements forming substantially rectangular openings, wherein the intersecting elements comprise polymer coated threads, wherein the intersecting elements have a denier of 250 or less, wherein the screen material has a mesh count of 17×20, an open area of at least 50%, an areal density of less than 5.0 oz/yard$^2$, and a light transmission of at least 50%, wherein the polymer coated threads comprise 25% by weight of a polyester thread core and 75% by weight of a PVC coating over the polyester thread core.

8. The screen material of claim 7, wherein the threads have a diameter of substantially 0.335 mm.

9. The screen material of claim 7, wherein the screen material has an optical clarity of 60% to 98%.

10. A screen material comprising:

a mesh of intersecting elements forming substantially rectangular openings, wherein the intersecting elements comprise polymer coated threads, wherein the intersecting elements have a denier of 250 or less, wherein the screen material has a mesh count of 20×20, an open area of at least 50%, an areal density of less than 5.2 oz/yard$^2$, and a light transmission of at least 50%, wherein the polymer coated threads comprise 25% by weight of a polyester thread core and 75% by weight of a PVC coating over the polyester thread core, and wherein the screen material has an abrasion resistance of greater than 500, as measured by ASTM D3884-09-2013, and a tensile strength for each of warp and weft of greater than 120 lbf, as measured by ASTM D5035-11.

11. The screen material of claim 10, wherein the threads have a diameter of substantially 0.335 mm.

12. The screen material of claim 10, wherein the screen material has an optical clarity of 60% to 98%.

13. An insect screen panel comprising the insect screen material of claim 7 positioned in a frame, wherein the frame comprises at least three elongated beams each having:

four flat exterior sides forming a rectangle tube with a hollow interior channel extending longitudinally therethrough, and three or more spline grooves, each spline groove positioned adjacent an edge of one of the exterior sides, wherein each of the spline grooves include an outward facing opening and a recessed portion, wherein the outward facing opening is configured to receive an edge of the insect screen material and an elastomeric spline component to secure the screen panel to the elongated beam, and wherein the insect screen material is sized and shaped to fit within the frame and all edges of the insect screen material are positioned within an adjacent spline groove and secured therein by the elastomeric spline component.

14. The insect screen panel of claim 13, wherein a first exterior side of each elongated beam comprises a first spline groove that extends longitudinally along a length thereof, and a second exterior side adjacent to the first exterior side comprises second and third spline grooves that extend longitudinally along a length thereof.

15. The insect screen panel of claim 13, wherein each of a first and third exterior side of each elongated beam are congruent sides and comprise a first and second spline groove, respectively, that extend longitudinally along a length thereof, and a second exterior side of each elongated beam comprises a third and fourth spline groove that extend longitudinally along a length thereof.

16. An insect screen panel comprising the insect screen material of claim 10 positioned in a frame, wherein the frame comprises at least three elongated beams each having:

four flat exterior sides forming a rectangle tube with a hollow interior channel extending longitudinally therethrough, and three or more spline grooves, each spline groove positioned adjacent an edge of one of the exterior sides, wherein each of the spline grooves include an outward facing opening and a recessed portion, wherein the outward facing opening is configured to receive an edge of the insect screen material and an elastomeric spline component to secure the screen panel to the elongated beam, and wherein the insect screen material is sized and shaped to fit within the frame and all edges of the insect screen material are positioned within an adjacent spline groove and secured therein by the elastomeric spline component.

17. The insect screen panel of claim 16, wherein a first exterior side of each elongated beam comprises a first spline groove that extends longitudinally along a length thereof, and a second exterior side adjacent to the first exterior side comprises second and third spline grooves that extend longitudinally along a length thereof.

18. The insect screen panel of claim 16, wherein each of a first and third exterior side of each elongated beam are congruent sides and comprise a first and second spline groove, respectively, that extend longitudinally along a length thereof, and a second exterior side of each elongated beam comprises a third and fourth spline groove that extend longitudinally along a length thereof.

* * * * *